US00RE34177E

United States Patent [19]

Coxhead et al.

[11] E Patent Number: Re. 34,177

[45] Reissued Date of Patent: Feb. 9, 1993

[54] OVEN FOR BLOW MOLDING MACHINE

[75] Inventors: Bruce Coxhead, Bond Head; Gary Hughes, Bolton; John R. Murchie, Everett, all of Canada

[73] Assignee: Husky Injection Molding Systems Ltd., Bolton, Canada

[21] Appl. No.: 727,833

[22] Filed: Jul. 9, 1991

Related U.S. Patent Documents

Reissue of:

[64] Patent No.: 4,923,395
Issued: May 8, 1990
Appl. No.: 271,719
Filed: Nov. 16, 1988

[51] Int. Cl.[5] ..... F27D 5/00

[52] U.S. Cl. ..... 432/5; 432/147; 432/229; 34/105

[58] Field of Search ..... 432/33, 135, 146, 147, 432/162, 175, 184, 194, 224–226, 229, 5; 34/104, 105

[56] References Cited

U.S. PATENT DOCUMENTS

| | | | |
|---|---|---|---|
| 3,166,304 | 1/1965 | Alexeff | 432/229 |
| 3,290,026 | 12/1966 | Alexeff | 432/229 |
| 3,472,499 | 10/1969 | Burch | 432/229 |
| 3,584,846 | 6/1971 | McCoy | 432/147 |
| 3,917,445 | 11/1975 | Suva et al. | 432/147 |
| 3,930,790 | 1/1976 | Rogosch | 432/229 |
| 3,975,618 | 8/1976 | Goos et al. | 34/105 |
| 4,690,633 | 9/1987 | Schad et al. . | |

*Primary Examiner*—Henry C. Yuen
*Attorney, Agent, or Firm*—Bachman & LaPointe

[57] ABSTRACT

A method and apparatus is disclosed for establishing a preferred temperature profile useful in the oven portion of a blow molding machine by incrementally adjusting heating elements for the exterior of the oven while a stream of parisons are in motion through the oven. The disclosure also includes means and method for preserving and duplicating a preferred temperature profile.

10 Claims, 3 Drawing Sheets

OVEN FOR BLOW MOLDING MACHINE

Matter enclosed in heavy brackets [ ] appears in the original patent but forms no part of this reissue specification; matter printed in italics indicates the additions made by reissue.

BACKGROUND OF THE INVENTION

The present invention relates to plastic preforms or parisons and relates, in particular, to heat treatment of parisons to condition the parisons for further treatment or further forming such as blow molding.

Classically, a series of parisons are conveyed continuously which being rotated on a support mandrel through an oven containing a battery of heating elements. The heating elements impart heat to the body of the parison usually (but not necessarily) from top to bottom of a vertically disposed parison to condition plastic from which the parison is molded for subsequent treatment.

Invariably, the heating elements are fixed in position within the oven and are arranged relative to the path traversed by the parison and relative to the shape of the parison to create a desired temperature profile throughout the body of the parison.

That is, one heating element of a vertical array of elements is positioned a first distance from a first point or first region on the body of the parison while another heating element of the array is positioned a second distance from a second point on the body of the parison thereby creating a temperature profile and establishing a temperature gradient in the body of the parison.

A prior art device showing a battery of heating elements for conditioning the parison is disclosed and described in U.S. Pat. No. 4,690,633 to Schad et al. Reference to this patent shall be made a part of the file of this application by filing an Information Disclosure Statement accompanying the filing of this application.

In prior art devices, of which the '633 disclosure is typical, there are disadvantages arising from inability to (1) adjust the temperature profile readily and conveniently to satisfy the temperature requirements of a given parison structure, (2) to reset or readjust heating elements to satisfy requirements of an entirely different run of parisons or (3) repeat an earlier set-up.

In one prior art arrangement with fixed electric heating elements, the temperature profile is adjusted by varying or changing the power to the heating elements. While this procedure is operative, it does not possess sufficient flexibility to meet with requirements of tapered conical or other unusual shaped parisons.

While operating an electric element at maximum rating from a fixed position, heat generated is frequently insufficient to provide the desired temperature profile. Moveover, operating at maximum rating for sustained intervals reduces the effective life of the unit resulting in increased manufacturing costs.

In other prior art devices, the heating elements are fixed for a given run of parisons and while such elements are adjustable, to and fro, relative to the parison, it is necessary to dismantle the oven virtually to perform laborious and time consuming steps to set-up, initially, and make numerous adjustments to fine tune the heat requirements of a given run of parisons or to reset and readjust the heating elements for entirely different parison configurations.

As indicated above, frequently it is necessary to alter original settings several times in order to gain the optimum temperature profile for a given parison configuration. Obviously, the need to dismount heating elements involving adjustment of threaded member or other piece parts to gain the proper temperature profile, is laborious, time consuming and costly.

SUMMARY OF THE INVENTION

In contrast, the present invention provides an apparatus and a process facilitating convenient, initial setting and subsequent adjustment of the position of individual heating elements in a battery of elements.

It is a principal feature of the present invention to provide a novel process for developing a desired temperature profile to heat treat a plastic parison.

It is a further important feature of the present invention to provide an apparatus operable to set and adjust individual heating elements, to and fro, relative to a continuously advancing line or series of parisons in incremental fashion from a point external of the heating oven.

A further feature of the invention is the provision of a battery of heating elements, for the purpose indicated above, where each element is provided with individual support means including adjustment means for moving individual elements selectively and in step by step fashion to a variety of positions relative to a selected portion, region or point on the body of a parison.

It is a further feature of the invention to provide storable, coordinate indicia on each heating element support means for identifying the exact position of a particular element making it very convenient to reproduce the heating element setting at any time in the future. This feature is particularly useful When it is desired to duplicate a run following numerous intervening runs each having different temperature profile requirements.

It is a further feature of the present invention to provide a movable (hinged) support structure for a battery of heating elements so that the complete battery unit can be swept clear of the parison transport for service and/or replacement of heating elements, as required.

It is to be noted that the nature of the heating elements, per se, is not critical to the present invention and it is to be understood that the heating elements can take the form of electric filaments enclosed in glass tubes or similar structures, electrical filaments coated with metal or ceramic material, gas burners or other heat sources as the composition of the plastic, parison design and engineering considerations dictate.

A still further feature of the invention is the provision of a reflector or shield means disposed about the heating elements positioned to focus heat toward the parison body.

The reflectors also serve as a protective shield in the event a distorted or deformed parison carried by its conveyor rotates eccentrically thereby making damaging contact with one or more heating elements.

It has been found in prior art oven arrangements with unprotected heating elements that a "bent" or "lopsided" parison on its rotating mandrel sweeps through an oven on its conveyor damaging many fragile heating elements before the defect can be detected and the deformed parison removed.

To overcome this problem, the reflectors project an appreciable distance toward the parison beyond the exposed surface of the heating element thereby protecting the fragile elements from interference with whirling deformed parisons.

An apparatus for heat treating a series of rotating parisons advancing through an oven carried by suitable conveyor means embracing principles of the present invention may comprise an oven means, means for conveying and rotating a series of plastic parisons through said oven means, support means carrying a battery of heating elements and movable means individual to each heating element extending to the exterior of oven means for positioning and adjusting the individual heating elements relative to said parisons, in incremental fashion to establish a temperature profile for heating the parisons.

A process embracing certain other principles of the invention effective to create a heat screen or heat front having a desired temperature profile for heat treating a given plastic parison structure may comprise the steps of transporting a series of rotating parisons along a predetermined path, arranging a battery of heating elements within an enclosure for directing heat toward said parisons, adjusting individual heating elements incrementally relative to said parison from a point external of said enclosure so that heat projected by individual heaters is a function of the position of said individual heaters relative to said parisons thereby establishing a desired temperature profile vis-a-vis the body of each parison.

Other features and advantages of the present invention will become more apparent from an examination of the succeeding specification when read in conjunction with the appended drawings, in which:

DETAILED DESCRIPTION

Figure 1:
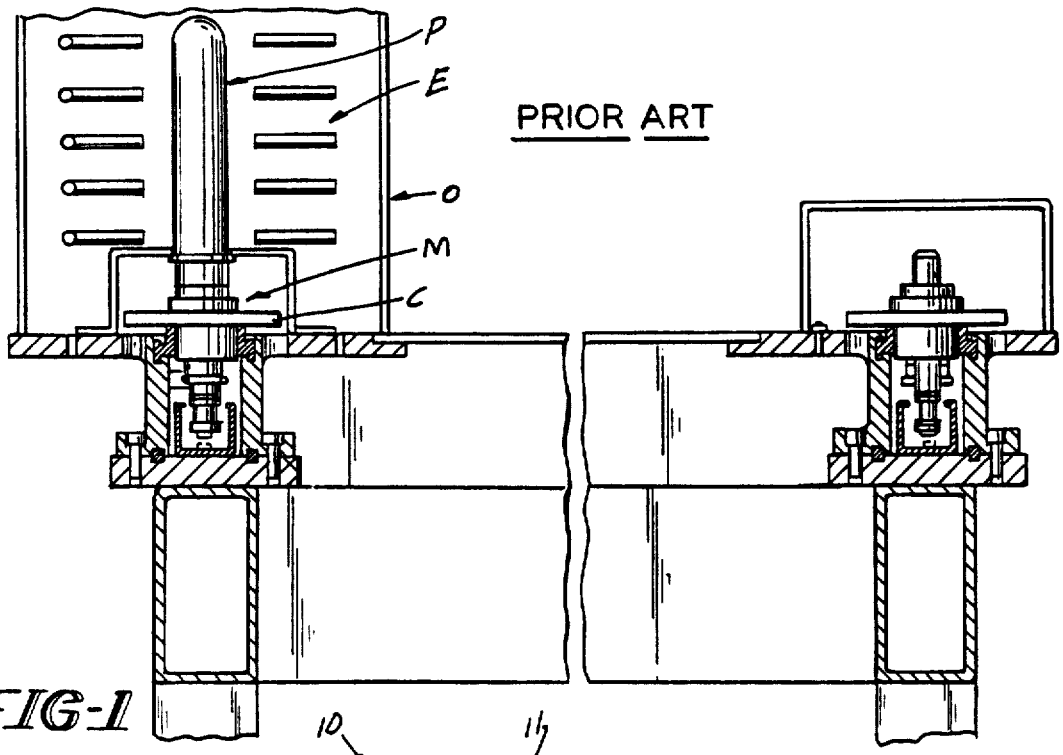
FIG. 1 is a vertical section of a prior art apparatus having fixed heating elements.

Referring now in detail to the drawings, FIG. 1 shows an oven O enclosing fixed heating elements E operative to heat a parison P supported on a rotating mandrel M carried by conveyor C.

Referring now to FIGS. 2, 3, 4 and 5, the reference numeral 10 indicates, generally, a parison oven comprising an oven enclosure 11, including sidewalls 12 and 15. Mounted on oven sidewall 12 by means of a bracket 13 is a batttery of heating elements indicated, generally, at 14. A parison 16 (FIG. 2) supported by mandrel 17 is rotatably mounted on conveyor 18."

In usual and customary manner, a stream of rotating parisons are moved continuously by conveyor 18 into and out of the oven 10 for purposes of receiving heat treatment prior to blow molding.

Figure 3:
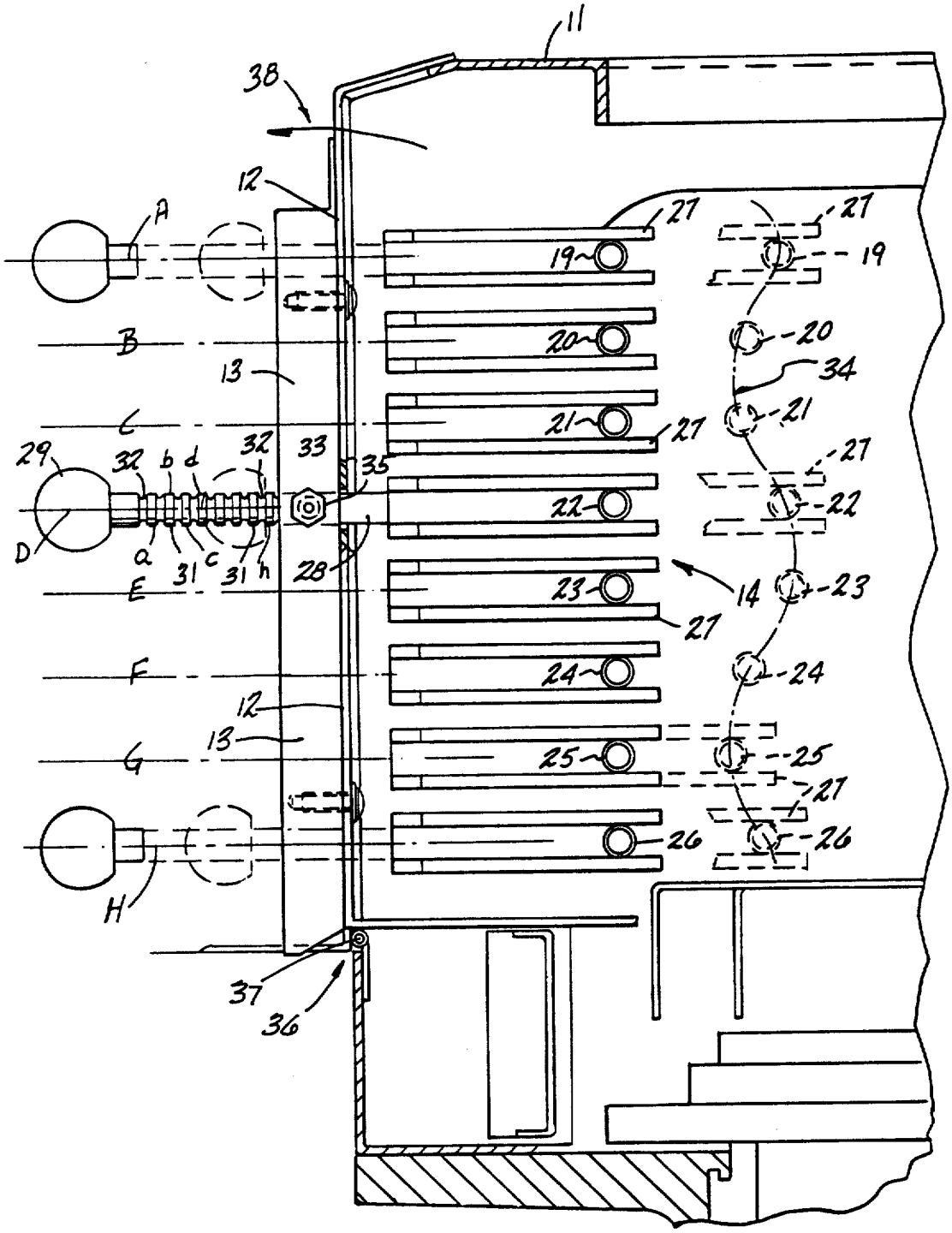
FIG. 3 is a view similar to FIG. 2, enlarged, showing details of the heating element supports and the incremental heating element adjustment means.
Figure 4:
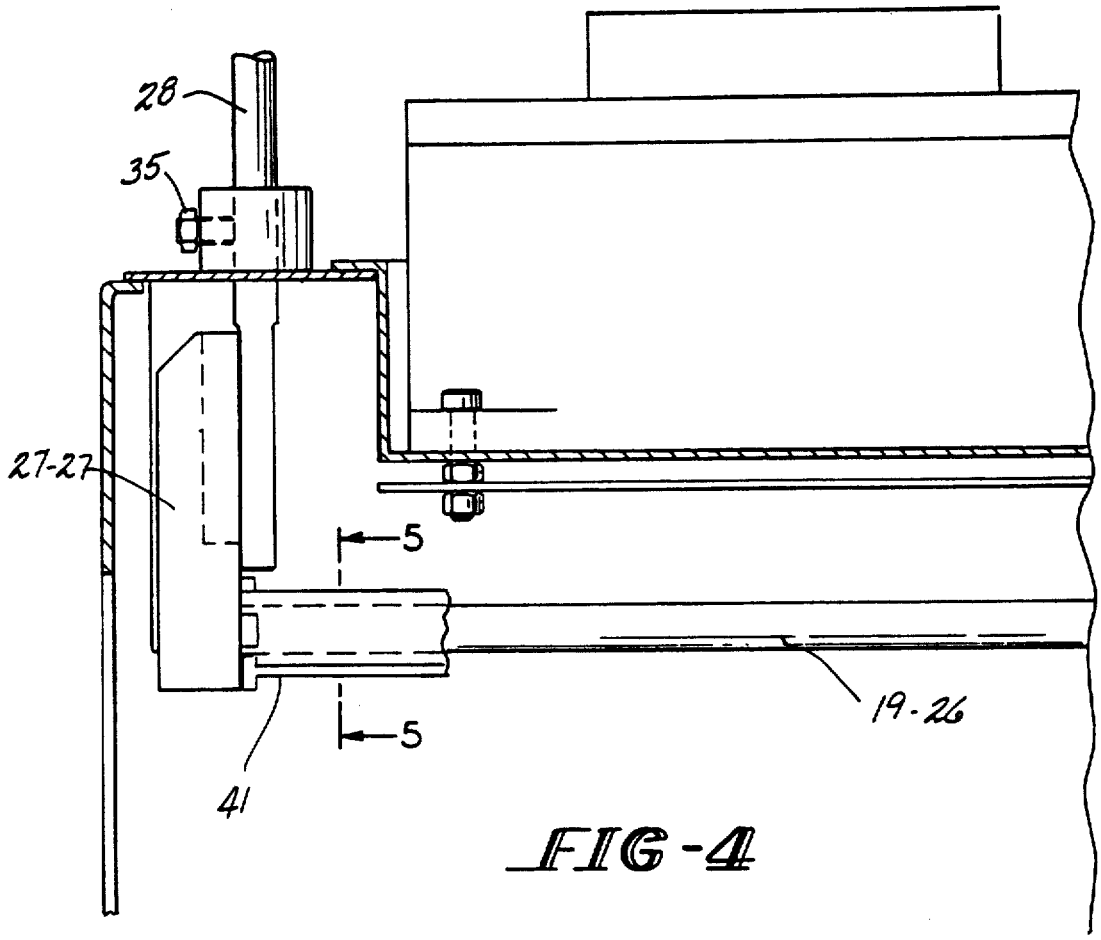
FIG. 4 is a plan view of one end of a heating element support means.

Individual heating elements 19 through 26 (FIG. 3), defining elongated tubes, as is next apparent in FIGS. 3 and 4, are supported at each end by movable support means 27.

While the left end of movable support means 27 is disclosed in FIG. 4, it is to be understood that the right end (not shown) is a mirror image of the left end.

The movable support 27 includes a shaft extension 28, slidably received in bracket 13, projecting through oven sidewall 12 and terminating in an operating knob 29.

Each heating element 19–26 is provided with a shaft 28. For convenience, only one shaft will be described with the understanding that each heating element is supported and adjusted individually in identical fashion.

Figure 2:
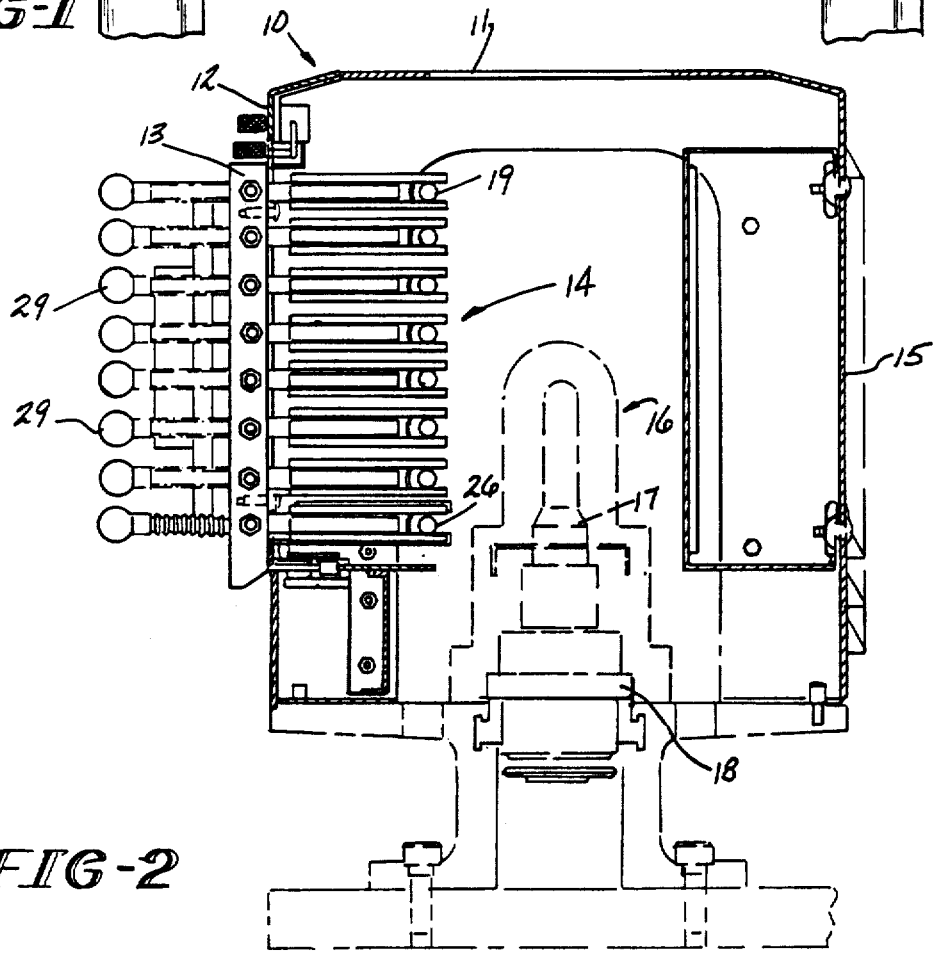
FIG. 2 is an end view, partially in section, of a parison oven embracing principles of the present invention.

As is most apparent in FIGS. 2 and 3, the shaft 28 is formed with a plurality of lands 31 with intervening grooves 32. The lands and grooves are part of an adjustment means which, in the disclosed embodiment, defines a detent mechanism. Cooperating with the lands and grooves is a spring pressed ball 33, shown in dashed lines in FIG. 3 and retained by nut 35 operative to snap into and out of grooves 32 as operating knob 29 is manipulated toward and away from parison 16.

While the adjustment means disclosed is a detent mechanism, it is entirely within the spirit and scope of the invention to use other convenient arrangements, such as threads on the shaft 28, a friction fit between the shaft 28 and the bracket 13, so long as appropriate indicia are provided for "reading" the position of the respective shafts 28 in a manner which will become more apparent as this specification proceeds.

As indicated in FIG. 3, the heating elements are movable from the solid line position of heating element 19 in FIG. 3 to the dotted line position thereof by manipulation of the shaft 28 to move the heating element in incremental fashion toward the parison to develop a temperature profile indicated by the dashed line 34 of FIG. 3.

Note further that the battery of heating elements 19–26 are coded by appropriate indicia so that coordinates of their respective positions relative to the parison may be preserved for future runs when it is desired to reproduce a given temperature profile.

Thus, the letters A–H designate individual heating elements of a given battery and the letters a–h designate the axial position of a particular heating element. Therefore, one can readily record the position of a particular heating element for a given run by indicating that its position, for example, in FIG. 3 is D–h.

Obviously, the number of heating elements in a given battery and the number of segmental positions incorporated in the oven unit is a matter of choice.

Furthermore, spacing of the heating elements and their supports, as well as the dimension of the incremental adjustments, is also a matter of choice. Obviously, the detent means or other heating element adjustment means can take a variety of configurations so long as the unit is positive and includes indicia for reproducible settings.

Furthermore, its entirely within the spirit and scope of the invention that the battery embracing the heating elements be disposed vertically as in FIGS. 2 and 3 or horizontally relative to the parison or in a skewed position, as desired.

Referring to FIG. 3, note that the sidewall 12, to which the battery support 13 is secured, is movable in that the sidewall is hinged as at 36 by hinge pin 37 making it possible to swing the entire battery including its incrementally movable support shafts away from the parison train, to the left or counterclockwise as indicated by the arrow 38 in FIG. 3.

Figure 5:
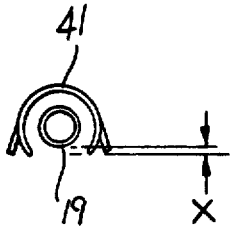
FIG. 5 is a vertical section of a portion of FIG. 4 showing the cross-sectional configuration of a heating element reflector-shield.

Referring in detail in FIGS. 4 and 5, note that the individual heating elements are partially enclosed by reflector 41 which focuses the heat in the direction of the parison. In addition, reflector 41 serves as a shield protecting the heating elements which are usually quite fragile, from destructive contact with a whirling, deformed or lopsided parison progressing through the oven.

To avoid destructive contact between the heat elements 19–26 and a wobbling, whirling, misaligned parison, the reflectors 41 project beyond the exposed surface of the heat elements a suitable distance identified by the dimension X in FIG. 5 to block damage to the heating elements.

In FIG. 4, it is apparent that the reflectors 41 are each supported at opposite ends by mating tube supports 27. The right end of the reflectors are supported at mating tube supports as is the case with each heating element.

It is apparent that there has been provided in accordance with this invention an improved oven for blow molding machine which fully satisfies the objects, means, and advantages set forth hereinbefore. While the invention has been described in combination with specific embodiments thereof, it is evident that many alternatives, modifications, and variations will be apparent to thOse skilled in the art in light of the foregoing description. Accordingly, it is intended to embrace all such alternatives, modifications, and variations as fall within the spirit and broad scope of the appended claims.

What is claimed is:

1. In a blow molding machine having an oven for heating rotating, multi-dimensional preforms or parisons advancing in a continuously or intermittently moving stream in a first direction through the oven, a method of establishing a precisely adjustable temperature profile extending in a second direction for heating the body of each parison to establish in each parison a preferred temperature gradient extending across the body of each said parison comprising the steps of:

placing a battery of individually moveable heating elements within said oven, said elements being arrayed in said second direction, supporting the arrayed elements so that heat generated by the elements plays directly upon the body of each parison substantially in line with said second direction, and adjusting individual heating elements in said array of elements along a third direction relative to the body of each parison while the stream of parisons is in motion in said first direction until a desired temperature profile is established whereby said preferred temperature gradient is created across the body of each parison substantially in the plane of said second direction in conformity with the dimensions of each parison.

2. The method of claim 1 in which the adjusting step is initiated outside the oven.

3. The method of claim 1 in which the adjusting step is conducted incrementally.

4. The method of claim 1 plus the step of establishing readable indicia individual to each heating element to facilitate reproduction of a preferred temperature profile.

5. The method of claim 4 plus the step of supporting the battery of heating elements including said readable indicia so as to be moveable as a unitary assembly.

6. The method of claim 1 plus the step of moving the battery of heating elements as a unit relative to the oven independently of said individual movement of each heating element whereby the full complement of heating can be serviced collectively and conveniently.

7. The method of claim 1 plus the step of focusing the heat generated by heat element individually.

8. The method of claim 1 plus the step of shielding each heating element individually against damage caused by deformed or misaligned parisons.

9. The method of claim 1 plus the steps of focusing the heat generated by each heating element and shielding each heating element simultaneously.

*10. In a blow molding machine having an oven for heating preforms or parisons which are mounted for rotation and for linear transportation through the oven including means for establishing a temperature profile for heating the body of each parison to establish in each parison a preferred temperature gradient extending throughout the body of each parison,*

*a method of establishing a reproducible temperature profile comprising the steps of:*

*placing a battery of individually moveable heating elements within said oven in a vertical array,*

*providing heating element adjustment means exterior of said oven,*

*manually adjusting the position of each heating element relative to the body of a parison to a desired position,*

*establishing a readable indicia for marking the position of each heating element relative to a given parison,*

*utilizing the indicia to identify the location of a desired position of each heating element, and*

*storing the indicia corresponding to an identified location to facilitate reproduction of a preferred temperature profile by resetting the location of each heating element.*

* * * * *